Feb. 24, 1970 J. D. BAYLESS 3,497,636

MONAURAL-BINAURAL PHONOGRAPH WITH INDEPENDENT SPACED PICKUP STYLI

Filed March 6, 1968

INVENTOR
James D. Bayless

BY Schmidt, Johnson, Hovey, Williams & Bradley.
ATTORNEYS.

United States Patent Office 3,497,636

Patented Feb. 24, 1970

3,497,636

MONAURAL-BINAURAL PHONOGRAPH WITH INDEPENDENT SPACED PICKUP STYLI

James D. Bayless, 4405 NE. Kelsey, Kansas City, Mo. 64116

Filed Mar. 6, 1968, Ser. No. 710,849
Int. Cl. G11b
U.S. Cl. 179—100.4 7 Claims

ABSTRACT OF THE DISCLOSURE

A phonograph pickup assembly comprised of a pair of elongated, rigid members each pointed at one end and disposed adjacent one another to present a unit. A resilient spacer between the members permits each member to vibrate independently of the other and each member is connected to its own phonograph cartridge. An electrical switch is interposed in the electrical circuitry coupling the cartridges with the phonograph and the needle is adapted to ride in a groove of a record having opposed sides of the groove impressed with different recordings. The switch permits either simultaneous playing of sound obtained from both sides of the groove, or only sound picked up from one side of the groove by one of the members.

This invention relates to phonographs and more particularly to a needle especially adapted to be received within phonograph record grooves having recordings impressed at each side edge of the groove.

Modern technology in recording intelligence on phonograph records has permitted the formation of grooves in the records which may have physical variations in one side of the groove which are different from the variations in the other side of the groove. These variations are, respectively, formed in accordance with different sounds so that the variations at one side of the groove may correspond with one sound while those at the other side of the groove correspond with a different sound. It is the principal object of this invention to provide a needle which is capable of responding separately to the physical variations at either side of the groove for either separate or simultaneous transmission of the electrical impulses to the remaining components of the phonograph where these impulses are transformed into sound.

It is another important object of the invention to provide structure as aforesaid wherein the impulses originating from either side of the phonograph groove may be selectively interrupted.

It is still another object of the invention to provide a phonograph needle comprised of separate members for transmitting the vibrations originated at the respective groove sides wherein each member is isolated from the vibrations of the other member so that the transmission from one member is not interfered with by vibrations of the other member.

These and other objects and aims of the invention will be more fully explained or will become apparent from the following description, claims and the drawing.

Figure 1:
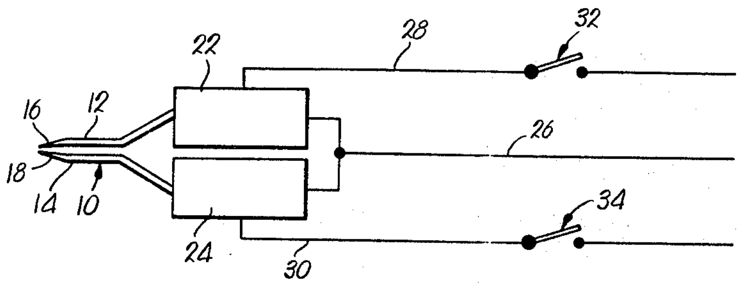
FIGURE 1 is a fragmentary, schematic illustration of a pick-up assembly for a phonograph and embodying the principles of this invention.
Figure 2:
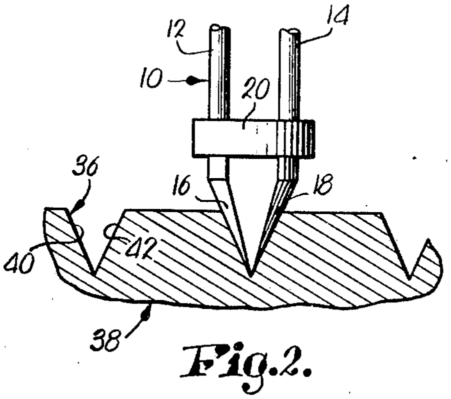
FIG. 2 is an enlarged fragmentary front elevational view of a phonograph needle constructed pursuant to the teachings of this invention, a phonograph record appearing fragmentarily in cross-section.
Figure 3:
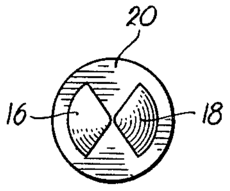
FIG. 3 is a bottom plan view of the needle of FIG. 2.
Figure 5:
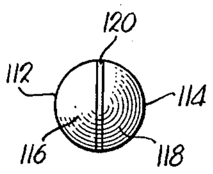
FIG. 5 is a bottom plan view of the needle of FIG. 4.

Referring initially to FIGS. 1–3, a needle constructed pursuant to the principles of this invention is broadly designated by the numeral 10 and includes a pair of elongated rigid members 12 and 14. The lowermost ends of the members 12 and 14 are configured to present points 16 and 18 respectively. It should be noted in FIG. 3 that points 16 and 18 are mounted in spaced relationship from one another by a disc 20 of yieldable material such as rubber, plastic or the like. It will be readily understood that disc 20 is provided with a pair of spaced apart transversely extending holes, each hole receiving a corresponding member 12 or 14.

As illustrated schematically in FIG. 1, the uppermost end of each member 12 and 14 is mechanically connected with a phonograph cartridge 22 and 24 respectively. A common electrical lead 26 is electrically coupled with both cartridges and cartridge 22 is electrically coupled with a line 28 while a similar line 30 is electrically coupled with the other cartridge 24. An electrical switch 32 is interposed in line 28 while a similar electrical switch 34 is interposed in line 30.

In operation, the components of the pick-up assembly are adapted to be carried by a phonograph pick-up arm (not shown) as is conventional. The needle 10 depends from the arm and is adapted to be engaged within a continuous groove 36 forming a part of a phonograph record 38. The groove 36 is comprised of a pair of opposite sides 40 and 42 respectively. It may be noted particularly in FIG. 2 that the lowermost inwardly inclined points 16 and 18 of needle 10 each complementally engage or ride along a corresponding side of the groove 36. It should further be noted that the outermost surfaces of points 16 and 18 are arcuate to permit longitudinal movement of needle 10 along groove 36 without damaging the undulations of the sides of the groove.

It is anticipated that a different recording will be impressed in each of the groove sides 40 and 42. For example, an instrumental performance might be recorded on the side 40 while vocal and instrumental performance might be recorded on side 42. During operation of the phonograph while record 38 is moved relative to needle 10, the respective recordings cause corresponding vibration in the members 12 and 14. These vibrations are translated into electrical impulses by the respective cartridges 22 and 24 and the impulses are transmitted to the amplifying and other components of the phonograph through the circuitry illustrated partially in FIG 1.

If the user of the phonograph desires to hear a combination of the recordings impressed at both sides of the groove, switches 32 and 34 are both closed whereupon all of the available electrical impulses are transmitted to the phonograph. On the other hand, should the user desire to play only the instrumental recording, he may merely open switch 34 whereupon no impulses emanating from member 14 and cartridge 24 are relayed to the audio reproducing and amplifying components of the phonograph. Those impulses emanating from member 12 and cartridge 22 are, however, amplified and played through the phonograph.

Obviously, a wide variety of uses other than the mere selective listening to either instrumental music alone or instrumental music accompanied by a vocalist exists. For example, a phonograph equipped with needles of this kind could be used for the study of voice or diction, melody in music and a wide variety of similar uses.

Figure 4:
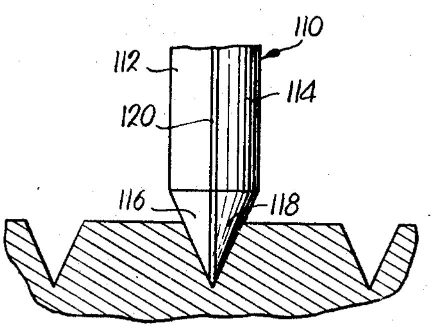
FIG. 4 is a view similar to FIG. 2 but illustrating a modified form of needle.

Referring now to FIG. 4, a modified form of needle is designated by the numeral 110 and includes juxtaposed elongated rigid members 112 and 114. Each member 112 and 114 is substantially semi-circular in transverse cross-section. A separator 120 comprising a sheet of yieldable material is sandwiched between the opposed flat faces of members 112 and 114 as illustrated in the drawing. The lowermost ends of the members 112 and 114 are provided with points 116 and 118 respectively. Manifestly, the operation of needle 110 is substantially similar to the operation of needle 10. The separator 120 is preferably made from rubber, plastic or other yieldable material to isolate the vibrations of one member from the other member. Thus, needle 110 may be interposed into a phonograph pick-up assembly of the type illustrated in FIG. 1 for producing the separate playing of intelligence recorded upon opposite sides of phonograph record grooves in the manner explained with respect to needle 10.

It will be understood by those skilled in the art that only one of the switches 32 and 34 is absolutely essential in structure capable of alternately providing reproduction of recordings from both or one side of the phonograph record groove. However, the use of two switches as illustrated in FIG. 1 provides for the ability to select the recording at either side of the groove.

Having thus described the invention, what is claimed as new and desired to be secured by Letters Patent is:

1. A phonograph needle comprising:

a pair of rigid members, each having a point formed at one end thereof;

spacer means engaging said members for holding the letter in spaced relationship, said points being disposed in relatively close mutual proximity and adapted for simultaneous disposition into a groove of a phonograph record with one point engaging each side of the groove;

cartridge means for each needle respectively, each cartridge means being secured to its corresponding member;

electrical circuit means coupled with each of said members and adapted to be coupled with a phonograph, for separately conducting the energy from the respective cartridge means to the phonograph; and switch means interposed in said circuit means for selectively interrupting the flow of electrical energy from one of said cartridge means.

2. The invention of claim 1, wherein said spacer means includes a disc formed of resilient material, said disc having a pair of spaced apart holes extending transversely therethrough, a member being received through each hole respectively.

3. The invention of claim 2, wherein said material is rubber.

4. The invention of claim 2, wherein said material is plastic.

5. The invention of claim 1, wherein each of said member is elongated and rigid.

6. The invention of claim 1, wherein said spacer means includes an elongated sheet of resilient material, said sheet being sandwiched between said members.

7. The invention of claim 6, each of said members being of substantially semi-circular transverse configuration, said members being disposed to present a substantially circular transverse configuration for said needle.

References Cited

UNITED STATES PATENTS

| | | | |
|---|---|---|---|
| 2,775,460 | 12/1956 | Shivack | 274—38 |
| 2,846,519 | 8/1958 | Morrell | 179—100.4 |
| 3,165,596 | 1/1965 | Boorman | 179—100.4 |

BERNARD KONICK, Primary Examiner

R F. CARDILLO, Jr., Assistant Examiner

U.S. Cl. X.R.

274—38; 179—100.41